(12) United States Patent
Gandolph et al.

(10) Patent No.: US 7,921,377 B2
(45) Date of Patent: Apr. 5, 2011

(54) METHOD FOR GENERATING AN INTERACTIVE MENU

(75) Inventors: Dirk Gandolph, Ronnenberg (DE); Jobst Hoerentrup, Hannover (DE); Ralf Ostermann, Hannover (DE); Hartmut Peters, Barsinghausen (DE); Carsten Herpel, Wennigsen (DE)

(73) Assignee: Thomson Licensing, Boulogne-Billancourt (FR)

( * ) Notice: Subject to any disclaimer, the term of this patent is extended or adjusted under 35 U.S.C. 154(b) by 223 days.

(21) Appl. No.: 10/581,815

(22) PCT Filed: Sep. 11, 2004

(86) PCT No.: PCT/EP2004/010186
§ 371 (c)(1),
(2), (4) Date: Jun. 2, 2006

(87) PCT Pub. No.: WO2005/055240
PCT Pub. Date: Jun. 16, 2005

(65) Prior Publication Data
US 2007/0180404 A1   Aug. 2, 2007

(30) Foreign Application Priority Data
Dec. 4, 2003  (EP) .................................... 03027957

(51) Int. Cl.
*G06F 3/48* (2006.01)
(52) U.S. Cl. ............ 715/825; 715/700; 725/86; 705/14; 705/15
(58) Field of Classification Search .................... 705/15, 705/14, 27; 715/835, 810; 725/39, 87, 86
See application file for complete search history.

(56) References Cited

U.S. PATENT DOCUMENTS

| | | | |
|---|---|---|---|
| 5,751,369 A | 5/1998 | Harrison et al. | |
| 5,897,623 A * | 4/1999 | Fein et al. | 705/27 |
| 5,929,857 A * | 7/1999 | Dinallo et al. | 715/840 |
| 6,469,719 B1 | 10/2002 | Kino et al. | |
| 2002/0013944 A1 * | 1/2002 | Gordon et al. | 725/39 |
| 2003/0007014 A1 | 1/2003 | Suppan et al. | |
| 2003/0040962 A1 * | 2/2003 | Lewis | 705/14 |
| 2003/0064757 A1 | 4/2003 | Yamadera et al. | |

FOREIGN PATENT DOCUMENTS

| | | |
|---|---|---|
| JP | 2000122783 | 4/2000 |
| WO | WO 98/47063 | 10/1998 |
| WO | WO 00/25198 | 5/2000 |

OTHER PUBLICATIONS

Search Report Dated Nov. 11, 2004.

* cited by examiner

*Primary Examiner* — Vanel Frenel
(74) *Attorney, Agent, or Firm* — Robert D. Shedd; Robert B. Levy; Jorge Tony Villabon

(57) ABSTRACT

A method for generating an interactive electronic menu on a display, the menu comprising menu items, wherein a menu item may be in a deselected, selected or activated state, and the menu being coded into a menu data segment, comprises that at least a first and a second menu item are connected by a parent-child relationship, wherein the second menu item being a child of the first menu item can only be selected when the first menu item is selected, and further comprises that the first and the second menu item are coded into the same data segment. The method is preferably usable for menus relating to content of digital storage media, such as optical discs, in particular read-only Blu-ray discs.

11 Claims, 3 Drawing Sheets

METHOD FOR GENERATING AN INTERACTIVE MENU

This application claims the benefit, under 35 U.S.C. §365 of International Application PCT/EP04/010186, filed Sep. 11, 2004, which was published in accordance with PCT Article 21(2) on Jun. 16, 2005 in English and which claims the benefit of European patent application No. 03027957.4, filed Dec. 4, 2003.

FIELD OF THE INVENTION

This invention relates to a method for generating an interactive menu. In particular, the invention discloses a method for generating an interactive menu relating to optical discs, e.g. Blu-ray discs.

BACKGROUND

Optical disc systems for storage of digital content, like Blu-ray discs (BD) and in particular BD-ROM, may contain interactive graphic streams that allow for graphic compositions to generate e.g. menus or game applications. A typical example is a menu, which is defined by graphic objects that represent and can be used as buttons within a graphic composition. As an example for gaming, a graphic object is used within a graphic composition for representing a playing card that appears when dealing out. The interactive screen manipulations within the menus or gaming applications are emulated by encoding multiple graphics compositions, each representing separate screen content. This is due to the restriction of a static graphic object arrangement within the graphics compositions, which does not allow any dynamic graphic object rearrangement during a lifecycle of the composition. With today's known methods, the flexibility in appearing and disappearing of graphical objects or also their changes in position on the screen is therefore limited. This is particularly disadvantageous for interactive applications, which are often related to audio-visual (AV) content of storage media.

A typical solution for the implementation of interactive graphics is interactivity emulation. This means that interactivity is created by providing a sequence of different screen images encoded by separate graphic compositions. Every graphic composition comprehends a full screen, and therefore always a new graphic composition is decoded when a part of the screen content is changed.

Graphic compositions for multiple screens are also used as a simple solution to provide interactive game applications. So, with respect to the examples mentioned above, the appearing of a playing card or a new menu button is created by decoding another graphic composition and rendering a complete new screen in the sequence. This takes a long time before the user can see the result of his remote action. The long response time is caused by searches on the disc to find the new graphics composition item, by the re-loading of the buffers and by the time needed for decoding and rendering the new graphics into the screen. This results in sluggish applications as known e.g. from DVD applications.

SUMMARY OF THE INVENTION

The problem to be solved by this invention is to improve the response time of interactive systems. The invention provides in claim 1 a method to define a hierarchy of graphical button objects within a graphic composition. This can be used to create interactivity by button help text or menus, for example in "breadcrumb" menus, i.e. a technique that always shows the way back for navigation across deeply nested sub-trees of hierarchical menus.

Another aspect of the invention is to provide button commands for graphical objects. Such button commands may allow e.g. rendering new graphic elements into the screen, and thus making graphics visible or invisible again, or can change the colour look-up table (CLUT), and therefore change the colours selected within the screen. All these modifications are executed as a reaction on the users remote control (RC) by real interactivity, and not by decoding a completely new image.

Interactive graphics compositions encoded on digital media like e.g. BD-ROM discs are utilized to provide to the user navigation and gaming applications closely adapted to the digital audio-visual (AV) content on the disc. E.g. a graphic composition for a menu coming from the disc is decoded into the screen, and the user can navigate through the displayed buttons and select one of them. Due to the large disc capacity and huge amount of AV content on the disc, the number of selection possibilities is quite large, and therefore the button size would be much to small when all selection possibilities would be displayed within one screen. Also, the user might easily be overstrained. Therefore multiple menu screens are used to provide a menu structure, and to break down the information into portions of selectable options the user can select from. Dividing the menu into multiple menu screens provides a simple kind of interactivity, previously implemented by means of independent graphic compositions.

Realizing interactive graphics by multiple screens usually leads to a bad conditioned reaction time. A user pressing a button on the RC will have to wait until the next graphic composition is depicted on the screen, and this depends on delay times caused by searching on the disc to find the new graphics composition item, re-loading the buffers and decoding the complete new graphics to the screen.

The solution proposed herein provides real interactivity capabilities within the graphics composition format, and thus avoids the mentioned delays. According to the invention, interactivity is reached by a simple interactive graphics model, which can be realized by a few syntax elements. The interactive graphics model provides the appearing and wiping out of graphical elements depending on the state of the interactive graphics model.

One improvement in interactivity is reached by defining a parent-child relation between graphical objects. The parent-child relation controls the appearing or vanishing of graphical elements on the screen, and allows e.g. to support button help text or the breadcrumb menu technique.

Another improvement in interactivity is achieved by introducing button action commands to change the visibility of other graphic objects within the graphics composition. Thus button commands can be used to make graphic objects visible or invisible or to change their positions, which is used typically for gaming, like the dealing out of cards in a game or moving an object in the screen depending on the users action on the cursor buttons.

A third improvement in interactivity is reached by changing the colour-look-up table (CLUT) on button commands. This allows quite a lot of other applications, e.g. changes in the picture appearance by highlighting, or the appearing and vanishing of objects from the screen due to the used colour-look-up table.

In a nutshell, a new type of button commands is proposed, having the purpose to modify the appearance of the current menu page, without having to decode a complete new screen with a new menu page.

According to the invention, a parent-child relationship is introduced between graphic objects representing a display hierarchy. The time at which a graphic child object is rendered into the screen depends on the status of its graphic parent object. This can be used e.g. for menus when moving the cursor across menu buttons represented by graphic objects. As known e.g. from Digital Versatile Disc (DVD) or BD-ROM, the buttons within a menu can have one out of three different states, namely the "normal", "selected" or "activated" state. Only when the button is in the "selected" state, it can enter the "activated" state. This behaviour is considered static, because all buttons are already on the screen. When applying a hierarchical parent-child relationship, the behaviour becomes dynamic, because the child buttons are not on the screen already from the beginning but only when their parent button changes into the "selected" state.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an example for a button help text application.

DETAILED DESCRIPTION OF THE INVENTION

Two application examples are given that exploit a hierarchical parent-child relationship of buttons within a menu.

Figure 1:
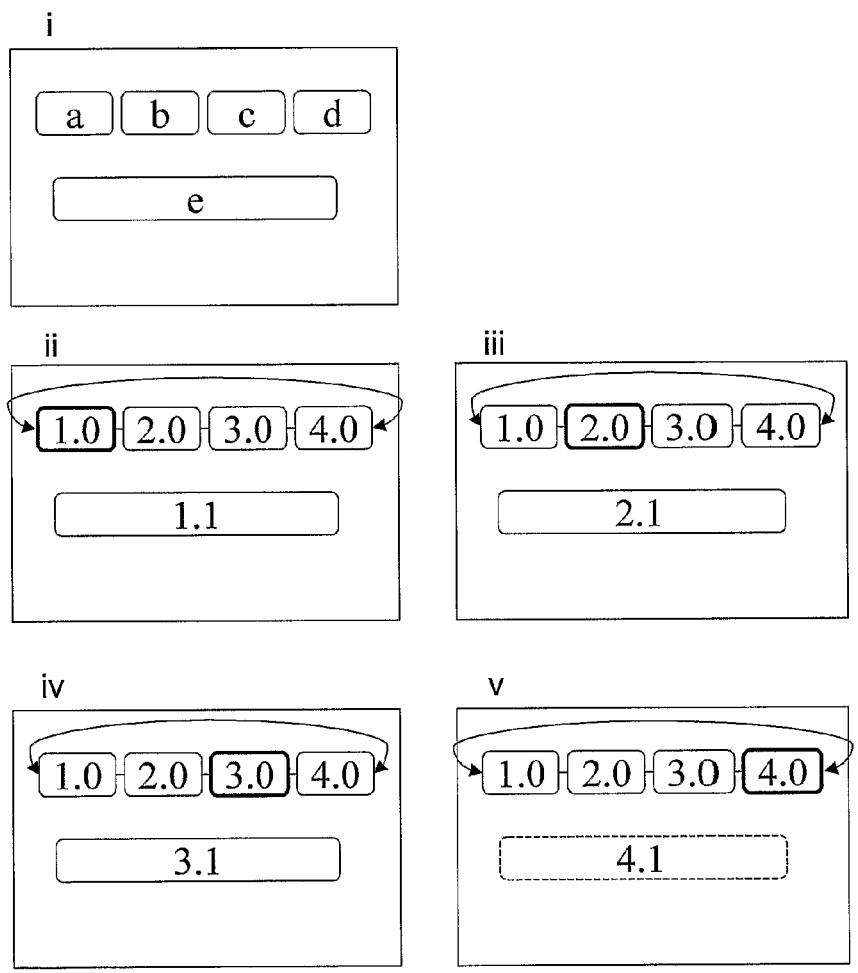

In a first embodiment, FIG. 1 shows how the graphic child button is used to provide button help text to the user.

When a button is selected, the associated help text is displayed, and explains to the user e.g. what action can be executed when pressing the "activate" button, or the "OK" button. The five parts (i)-(v) of FIG. 1 depict the relationship and different views of the interactive menu.

FIG. 1(*i*) shows the different positions a,b,c,d of menu buttons, and the position e of help text. The other parts (ii)-(v) of FIG. 1 show the menu with one button being selected, including the possible navigation transitions between the different buttons. In this exemplary application, only the parent buttons 1.0,2.0,3.0,4.0 are selectable, while the child buttons 1.1,2.1,3.1,4.1 are never navigated to, because they serve as help text only. When one of the parent buttons 1.0,2.0,3.0 is selected, the respective child button 1.1,2.1,3.1 is rendered into the screen, and therefore displayed. The fourth parent button 4.0 has a transparent child button 4.1. When the fourth parent button 4.0 is selected, no child button is visible, because its invisible child button 4.1 erases all previously rendered child buttons.

TABLE 1

| | Neighbourhood relation between buttons in FIG. 1 | | | | | | | |
|---|---|---|---|---|---|---|---|---|
| Button Position | 1.0 a | 1.1 e | 2.0 b | 2.1 e | 3.0 c | 3.1 e | 4.0 d | 4.1 e |
| upper_button_nr | (1.0) | (1.1) | (2.0) | (2.1) | (3.0) | (3.1) | (4.0) | (4.1) |
| lower_button_nr | (1.0) | (1.1) | (2.0) | (2.1) | (3.0) | (3.1) | (4.0) | (4.1) |
| left_button_nr | 4.0 | (1.1) | 1.0 | (2.1) | 2.0 | (3.1) | 3.0 | (4.1) |
| right_button_nr | 2.0 | (1.1) | 3.0 | (2.1) | 4.0 | (3.1) | 1.0 | (4.1) |

Tab.1 shows the neighbourhood relationship in detail. For each possible state of the menu, the possible actions are defined. E.g. the first column of Tab.1 means that when the first parent button 1.0 on position a is selected and the "upper" or the "lower" button on the remote control (RC) is pressed, then the first parent button 1.0 remains selected. When the RC's "left" button is pressed however, the fourth parent button 4.0 is selected, and when pressing the RC's "right" button, the second parent button 2.0 is selected. As shown in columns 2,4,6 and 8, the child buttons on position e have a self-referencing neighbourhood relation, i.e. no other button points to them, and they point to themselves.

Any rendered button supersets and erases all other buttons rendered before on the same position. FIG. 1(*v*) shows the erasure of the previously displayed help text. This is achieved by rendering a transparent child button image 4.1 into the location e, which makes any other child button image invisible.

In a second embodiment, a graphic child button is used to generate a multiple level hierarchy with two generations of dependencies. The first-generation graphic child buttons are parents of a second-generation graphic child buttons. In other embodiments, these may be parents of further generation child buttons. In this manner a breadcrumb menu can be realized, because the way for navigating back can be displayed.

Figure 2:
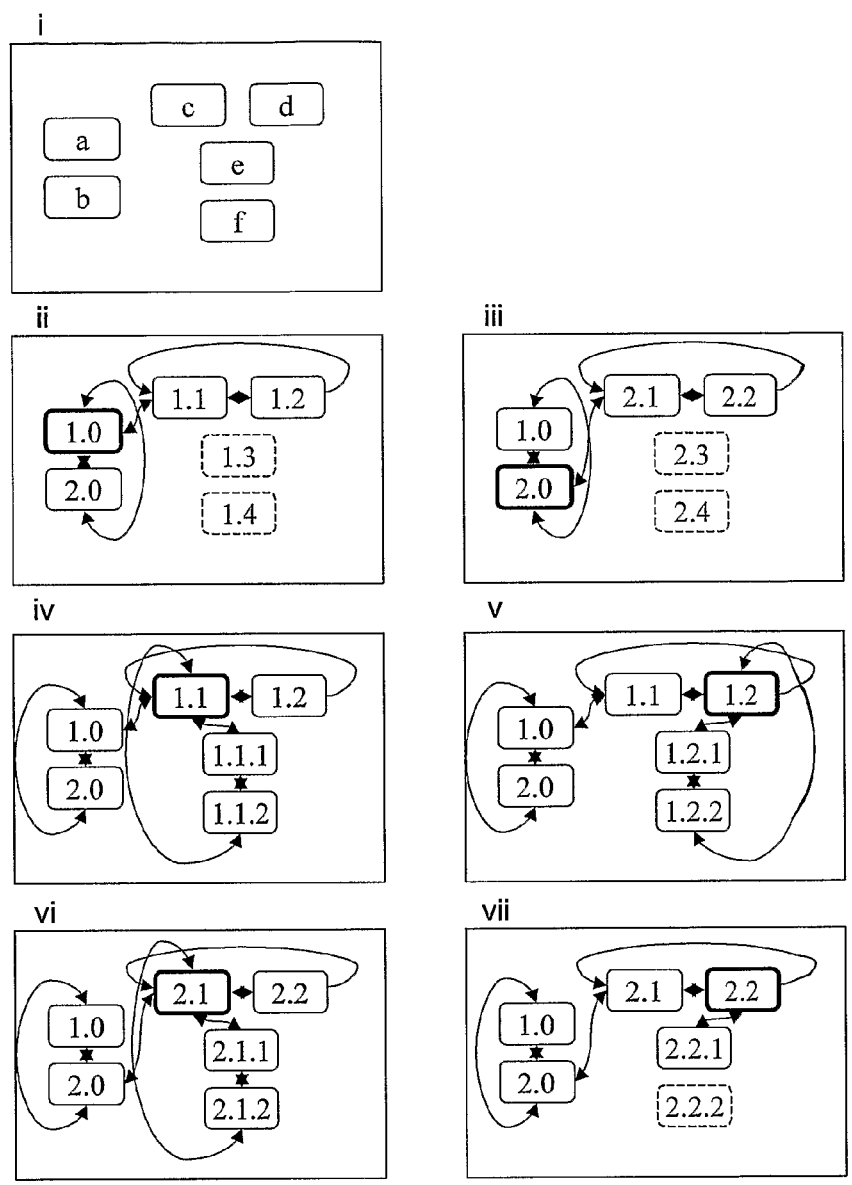
FIG. 2 an example for a breadcrumb menu technique application.

The seven parts (i)-(vii) of FIG. 2 depict the relationships and different views of an interactive breadcrumb menu. The possible positions a,b,c,d,e,f of the buttons are shown in FIG. 2(*i*). FIG. 2(ii)-FIG. 2(vii) show the situation when a parent button or/and a child button are selected, including the possible navigation transitions.

The first-generation child buttons 1.1, 1.2, 2.1, 2.2 are parent buttons for the second-generation child buttons 1.1.1, 1.1.2, . . . , 2.2.2. The second-generation child buttons are only rendered into the screen when a corresponding parent button of the first-generation child buttons is in the "selected" state. In FIG. 2(ii), the first parent button 1.0 is selected, and therefore its child buttons 1.1, 1.2, 1.3, 1.4 have been rendered into the screen. The child buttons 1.3 and 1.4 however are invisible and erase any previously shown button in these locations. If in this case the visible first child button 1.1 is selected, as shown in FIG. 2(iv), the two respective second-generation child buttons 1.1.1, 1.1.2 appear on positions e and f, and can be navigated to. If otherwise the second child button 1.2 is selected, as shown in FIG. 2(*v*), two other second-generation child buttons 1.2.1, 1.2.2 are rendered and can be navigated to. In FIG. 2(iii), the second parent button 2.0 is selected and its child buttons 2.1, 2.2, 2.3, 2.4 have been rendered into the screen. Also the child buttons 2.3 and 2.4 are invisible and erase any previously shown button in these locations. Note that x.3 and x.4 are invisible buttons in this example.

TABLE 2

Neighborhood information for breadcrumb menu

| button position | 1.0<br>a | 1.1<br>c | 1.2<br>d | 1.3<br>e | 1.4<br>f | 1.1.1<br>e | 1.1.2<br>f | 1.2.1<br>e | 1.2.2<br>f |
|---|---|---|---|---|---|---|---|---|---|
| upper_button_number | 2.0 | 1.1.2 | 1.2.2 | (1.3) | (1.4) | 1.1 | 1.1.1 | 1.2 | 1.2.1 |
| lower_button_number | 2.0 | 1.1.1 | 1.2.1 | (1.3) | (1.4) | 1.1.2 | 1.1 | 1.2.2 | 1.2 |
| left_button_number | (1.0) | 1.0 | 1.1 | (1.3) | (1.4) | (1.1.1) | (1.1.2) | (1.2.1) | (1.2.2) |
| right_button_number | 1.1 | 1.2 | 1.1 | (1.3) | (1.4) | (1.1.1) | (1.1.2) | (1.2.1) | (1.2.2) |

| button position | 2.0<br>a | 2.1<br>c | 2.2<br>d | 2.3<br>e | 2.4<br>f | 2.1.1<br>e | 2.1.2<br>f | 2.2.1<br>e | 2.2.2<br>f |
|---|---|---|---|---|---|---|---|---|---|
| Upper_button_number | 1.0 | 2.1.2 | 2.2.1 | (2.3) | (2.4) | 2.1 | 2.1.1 | 2.2 | (2.2.2) |
| lower_button_number | 1.0 | 2.1.1 | 2.2.1 | (2.3) | (2.4) | 2.1.2 | 2.2 | 2.2 | (2.2.2) |
| left_button_number | (2.0) | 2.0 | 2.1 | (2.3) | (2.4) | (2.1.1) | (2.1.2) | (2.2.1) | (2.2.2) |
| Right_button_number | 2.1 | 2.2 | 2.1 | (2.3) | (2.4) | (2.1.1) | (2.1.2) | (2.2.1) | (2.2.2) |

Tab.2 shows the neighbourhood relationship for the breadcrumb menu application example. The first-generation child buttons X.Y have their own second-generation child buttons X.Y.Z, and all second-generation child buttons are visible except for button 2.2.2 that is isolated and cannot be navigated to, as also shown in FIG. 2(vii). This is also an invisible button, like the first-generation child buttons 1.3,1.4,2.3 and 2.4 which cannot be navigated to either.

The signaling for a hierarchical parent-child relationship can be implemented easily by a single link mechanism. The link is pointing from a graphic child button object to its graphic parent button object only. The opposite link can also be given, but is not necessarily mandatory. As a preferred embodiment, a link field is introduced that designates the parent button object by means of a unique ID within the graphic composition. Tab.3 shows such link field parent_button_number within a graphic button object. If the parent button number is referencing to itself, i.e. when it carries its own button_number, it is not a graphic child button and has to be rendered into the screen from the beginning.

TABLE 5

Syntax for the composition of menu buttons

| Syntax | Size | Type |
|---|---|---|
| graphic_composition( ) { | | |
|   segment_type | 8 | bslbf |
|   segment_length | 16 | uimsbf |
|   composition_number | 16 | uimsbf |
|   ... | | |
|   while (processed_length < segment_length) { | | |
|     button_number | 8 | uimsbf |
|     ... | | |
|     parent_button_number | 8 | uimsbf |
|     ... | | |
|     masked_button_flag | 1 | uimsbf |
|     ... | | |
|     button_horizontal_position | 16 | uimsbf |
|     button_vertical_position | 16 | uimsbf |
|     neighbor_info( ) { | | |
|       upper_button_number | 8 | uimsbf |
|       lower_button_number | 8 | uimsbf |
|       left_button_number | 8 | uimsbf |
|       right_button_number | 8 | uimsbf |
|     } | | |
|     normal_state_info( ) { | | |
|       start_object_id_normal | 16 | uimsbf |
|       end_object_id_normal | 16 | uimsbf |

TABLE 5-continued

Syntax for the composition of menu buttons

| Syntax | Size | Type |
|---|---|---|
|       repeat_normal_flag | 1 | bslbf |
|       reserved | 7 | bslbf |
|     } | | |
|     selected_state_info( ) { | | |
|       start_object_id_selected | 16 | uimsbf |
|       end_object_id_selected | 16 | uimsbf |
|       repeat_selected_flag | 1 | bslbf |
|       reserved | 7 | bslbf |
|     } | | |
|     actioned_state_info( ) { | | |
|       start_object_id_activated | 16 | uimsbf |
|       end_object_id_activated | 16 | uimsbf |
|     } | | |
|     num_of_button_commands | 8 | uimsbf |
|     for( command_id = 0; | | |
|       command_id < | | |
|       num_of_button_commands; | | |
|       command_id++ ) { | | |
|       button_command[command_id] | 96 | bslbf |
|     } | | |
|   } | | |
| } | | |

Tab.5 shows the syntax of an exemplary graphic_composition segment for the composition of menu buttons. It can be used e.g. as an "interactive composition segment" for BD-ROM. Such graphic composition segment holds neighbourhood information, button state display information for the different states of a button, and button command information. Additional fields allow indicating the hierarchical parent child relationship and the masked button application, as described in the following. In both cases visibility of the respective buttons is dependent from the parent button or button commands.

Another idea of the invention is the introduction of button commands that make graphic objects disappear or appear. These graphic objects can also be buttons. The gist of this aspect of invention in interactive graphics is that specially marked graphic objects are encoded within and for a graphic composition, but not displayed automatically or initially on the screen. The marking of the graphic objects consists of a masking flag (masked_button-flag), listed in Tab.5. Masked graphic objects can be rendered into the screen upon user interface commands, usually RC button commands. Using the exemplarily described simple syntax, the combination of graphic objects indicated for being masked and the corresponding button commands applied for manipulating these graphic objects provides a quite large range of different and powerful applications. Commands for manipulating such masked graphic objects can be e.g. a command for making the graphic object visual (render_object), a command for making the graphic object invisible (erase_object), a command for re-positioning the graphic object (move_object) and a command for changing the colour look-up table (CLUT) of a graphic object or the whole screen (select_clut).

Preferred embodiments of this aspect of the invention are also listed in Tab.5. In this case the graphic object is a graphic button object. When the flag masked_button_flag is set, the button described is a masked button and will not be automatically rendered into the screen when the graphic composition is decoded. Depending on the button commands executed when a button of the graphic composition was set to "activated" state, the masked button can be manipulated.

The button commands for a single button as listed in Tab.5 can be extended by various manipulations, e.g. making the button visible, making the button invisible, moving button positions and manipulating the button CLUT. In general, the CLUT manipulation bears the potential to make graphic objects visible or invisible.

In the following, two application examples are given that exploit the combination of mask flag and button command.

Figure 3:
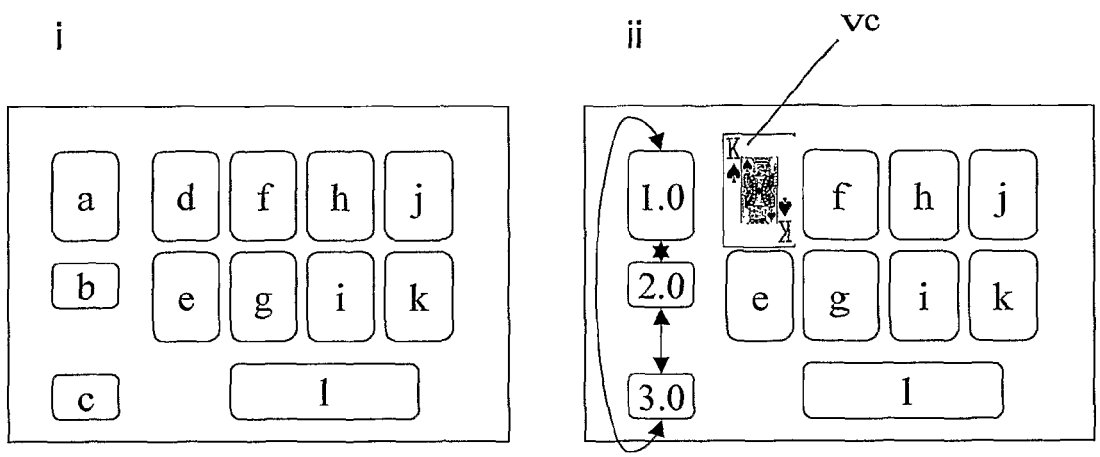
FIG. 3 an example for a "Black Jack" game application.

In FIG. 3 an example for a black jack game application is shown. While FIG. 3(i) depicts the screen and all positions a, . . . , l of different buttons visible or not visible on the screen, FIG. 3(ii) depicts the navigation neighbourhood relationship between the buttons. Three buttons 1.0, 2.0, 3.0 on positions a,b,c are initially visible and selectable. The other button positions d, . . . , l are used for graphic button objects that are flagged as masked buttons, and that are only displayed when according commands are executed from the button commands, which are defined for the visible and selectable buttons 1.0,2.0,3.0. These three buttons serve as "Deal out a card" for button 1.0, "Stop dealing" for button 2.0 and "Start a new game" for button 3.0.

This example implements a "Black Jack" game realized by the combination of command buttons and masked buttons, which serve as playing cards dealt out. While the playing cards are appearing or disappearing and cannot be navigated to, other buttons in the screen can be navigated to and can be activated from the user. When activating the buttons according to the "Black Jack" game rules, playing cards are set, i.e. masked buttons are rendered into the screen and become visible vc.

Figure 4:
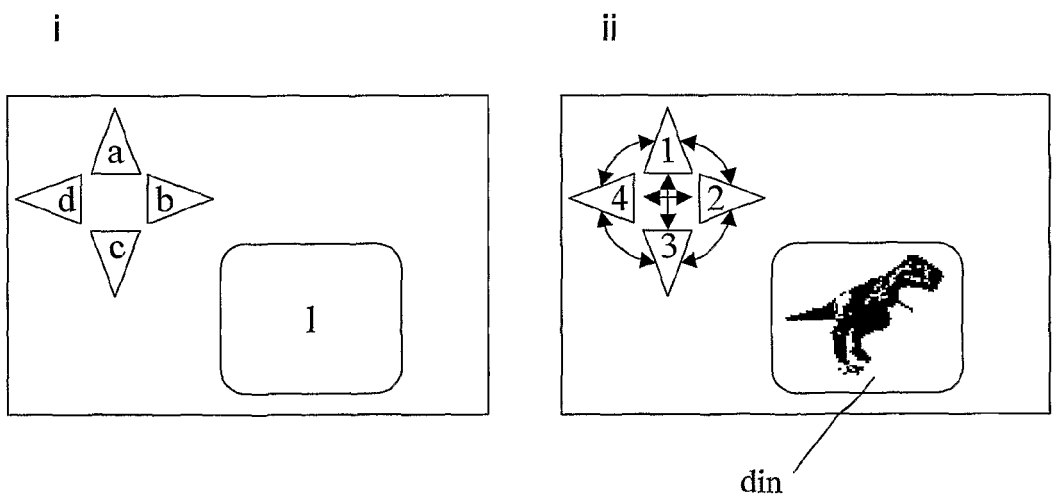
FIG. 4 an example for moving objects in a game application.

FIG. 4 shows an example for the manipulation of masked buttons din by moving it across the screen. This can be used for advanced interactive games. The actions associated with the cursor buttons 1, . . . , 4 on positions a, . . . , d execute a movement of the masked, but visible, graphic button object din. In this case, navigation to a button 1, . . . , 4 and activating the button is one step, because the "button activate" command is executed automatically when selecting the button. This can be achieved e.g. by setting a zero time out between selecting and activating the button.

The example shown in FIG. 4 is for gaming, e.g. a moving dinosaur application. While FIG. 4(i) depicts the screen and positions of different buttons visible or not visible on the screen, FIG. 4(ii) shows the navigation neighbourhood relationship between the invisible buttons 1, . . . , 4. The position 1 of a visible object din, the "dinosaur button", is a starting position only. The object changes its location when button commands on the RC are executed for moving the "dinosaur button". Buttons 1, . . . , 4 need not be visible within the screen. In this way, the user's view can be made clear for the dinosaur and the background only.

Tab.3 shows an example for a Player Status Register (PSR). The value of one of the registers (PSR11) is used to define a masked button that will be rendered into the graphic plain. When the value of PSR11 is changed, the button that is addressed by its value (button_ID) is instantaneously rendered. If the value contained in PSR11 does not match any of the button IDs available within the valid Interactive Composition segment (ICS), it is ignored.

TABLE 4

Player Status Register

| | Name | Meaning |
|---|---|---|
| 0 | Interactive Graphics | Interactive Graphics Stream Number |
| 1 | Audio | Audio Stream Number |
| 2 | Presentation Graphics | Presentation Graphics Stream Number |
| 3 | Angle | Angle Number |
| 4 | Title | Title Number |
| 5 | Chapter | Chapter Number |
| 6 | PlayList | PlayList Number |
| 7 | PlayItem | PlayItem Number |
| 8 | Presentation Time | Presentation Time in 90 kHz |
| 9 | Timer | Navigation Timer |
| 10 | Selected Button | Button Number in Selected State |
| 11 | Render Button | Button Number to be rendered |
| 12 | — | reserved |
| 13 | Parental | Parental Level |
| 14 | Video Configuration | Player Configuration for Video |
| 15 | Audio Configuration | Player Configuration for Audio |
| 16 | Audio Language | Language Code for Audio |
| 17 | Subtitle Language | Language Code for Presentation Graphics |
| 18 | Menu Language | Language Code for Menu Description |
| 19 | Interactive Graphics Language | Language Code for Interactive Graphics |
| 20 | — | reserved |
| . | . | . |
| . | . | . |
| . | . | . |
| 63 | — | reserved |

The invention is advantageous for use in interactive menus, particularly interactive menus relating to contents of optical discs. In particular, the invention can be used for interactive menus for read-only Blu-ray discs (BD-ROM).

The invention claimed is:

1. A method for generating an interactive electronic menu on a display, the menu comprising menu buttons, wherein a menu button may be in a deselected, selected or activated state, and the menu being coded into a menu data segment, comprising
   a. retrieving a data segment having encoded therein at least graphic data for a first and a second menu button and data connecting the first and the second menu button by a parent-child relationship, wherein the second menu button being a child of the first menu button can only be selected while the first menu button is selected and wherein at least one button command is associated to the first menu button and coded into said menu data segment, the button command being usable for modifying a visibility of at least the second menu button;
   b. generating the interactive menu on a display, wherein at least the first menu button but not the second menu button is displayed; and
   c. upon selection of the first menu button and execution of said button command, modifying said interactive menu such that the first and the second menu button are displayed simultaneously.

2. Method according to claim 1, wherein the second menu button is only visible when the first menu button is in the selected state.

3. Method according to claim 1, wherein the second menu button is not selectable.

4. Method according to claim 1, wherein the menu data segment contains at least for the first and the second menu button neighbour information, the neighbour information defining which other menu button may be selected when said first or second menu button is in the selected state.

5. Method according to claim 1, wherein the menu relates to the content of a removable storage medium, and the menu data segment is stored on the respective removable storage medium.

6. Method according to claim 1, wherein graphic data of said other menu data button is also coded into said menu data segment, wherein the visibility also comprises the colour look-up table relating to a menu button.

7. Method according to claim 1, wherein a third menu button is connected to the second menu button by a parent-child relationship, wherein the third menu button being a child of the second menu button can only be selected when the second menu button is selected, and wherein the first, the second, and the third menu button are coded into the same data segment.

8. Method according to claim 1, wherein the parent-child relationship within the menu data segment is indicated by a unidirectional or bi-directional link or identifier being retrieved from the menu data segment.

9. Method according to claim 1, wherein the second menu button is rendered as a new graphic element on the display, wherein the newly rendered button supersets and erases all other buttons rendered before on the same display position and wherein the remainder of the display is not re-rendered.

10. Apparatus for generating an interactive electronic menu on a display, the menu comprising menu buttons, wherein a menu button may be in a deselected, selected or activated state, and the menu being coded into a menu data segment, comprising:
  means for retrieving a data segment having encoded therein at least graphic data for a first and a second menu button and data connecting the first and the second menu button by a parent-child relationship, wherein the second menu button being a child of the first menu button can only be selected while the first menu button is selected and wherein at least one button command is associated to the first menu button and coded into said menu data segment, the button command being usable for modifying a visibility of at least the second menu button;
  means for generating the interactive menu for being displayed on a display, wherein at least the first menu button but not the second menu button is displayed; and
  means for modifying said interactive menu, upon selection of the first menu button and execution of said button command, such that the first and the second menu button are displayed simultaneously.

11. Apparatus according to claim 10, wherein the second menu button is rendered as a new graphic element on the display, wherein the newly rendered button supersets and erases all other buttons rendered before on the same display position and wherein the remainder of the display is not re-rendered.

* * * * *